No. 694,709. Patented Mar. 4, 1902.
W. A. WOODESON.
STEAM ACTUATED VALVE FOR ENGINES AND MOTORS.
(Application filed Sept. 21, 1901.)
(No Model.) 3 Sheets—Sheet 2.
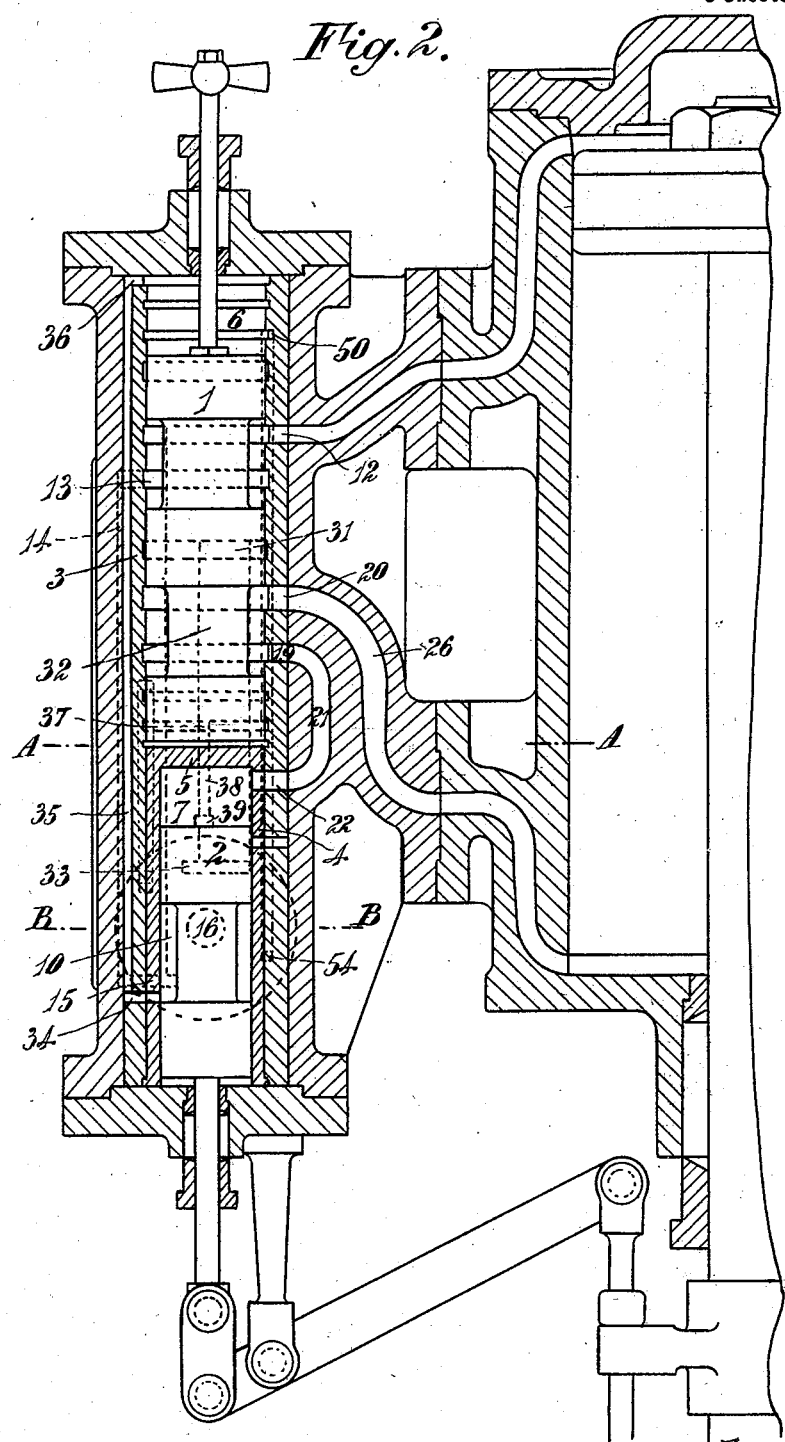

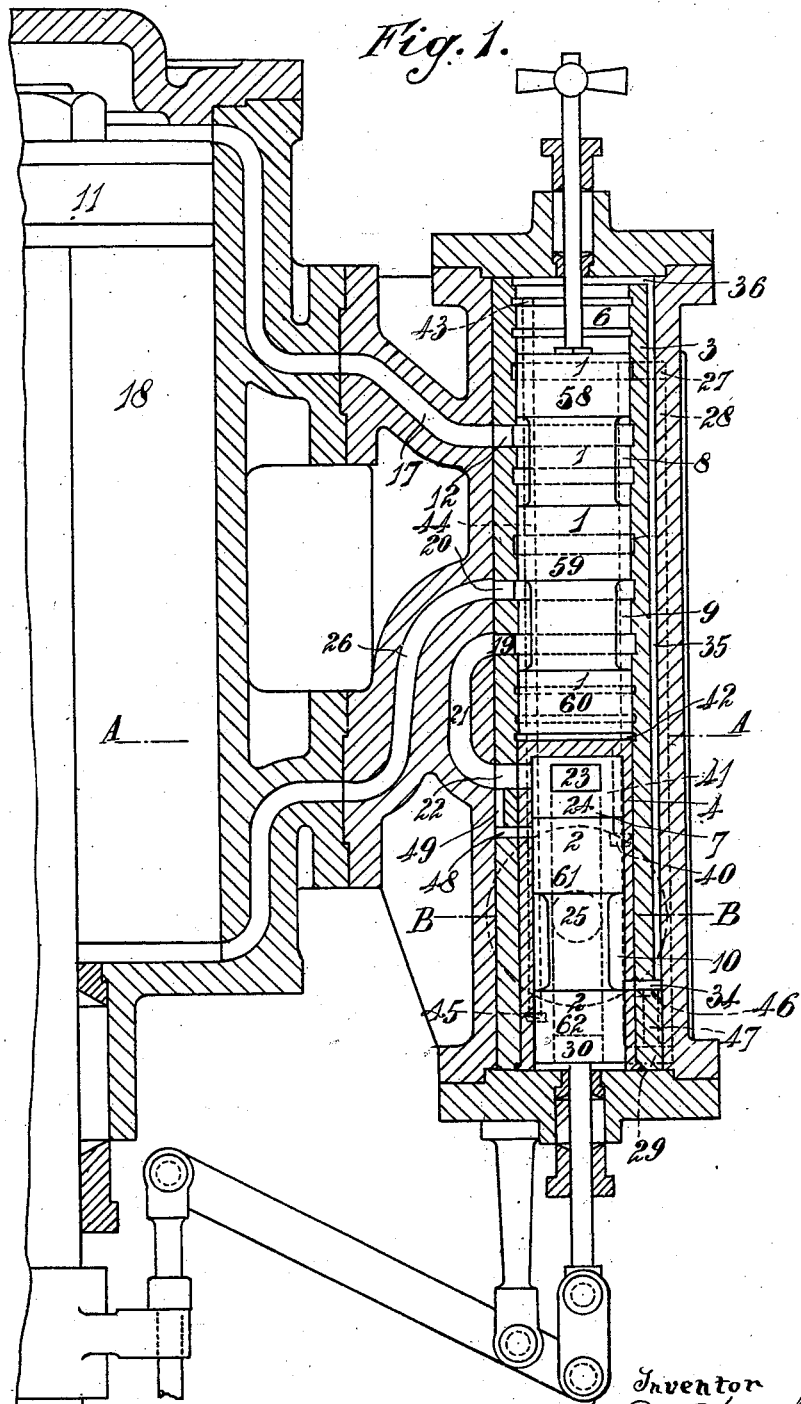

No. 694,709. Patented Mar. 4, 1902.
W. A. WOODESON.
STEAM ACTUATED VALVE FOR ENGINES AND MOTORS.
(Application filed Sept. 21, 1901.)
(No Model.) 3 Sheets—Sheet 3.
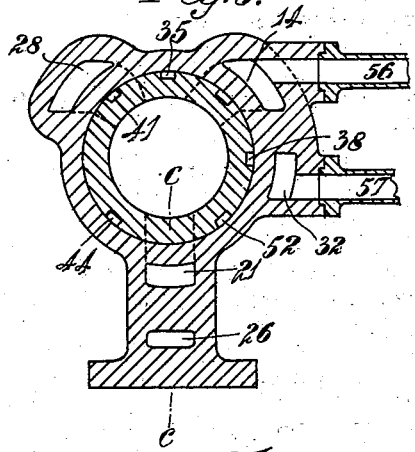
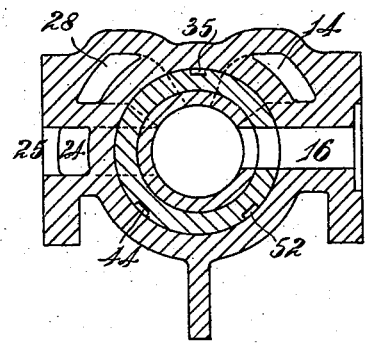
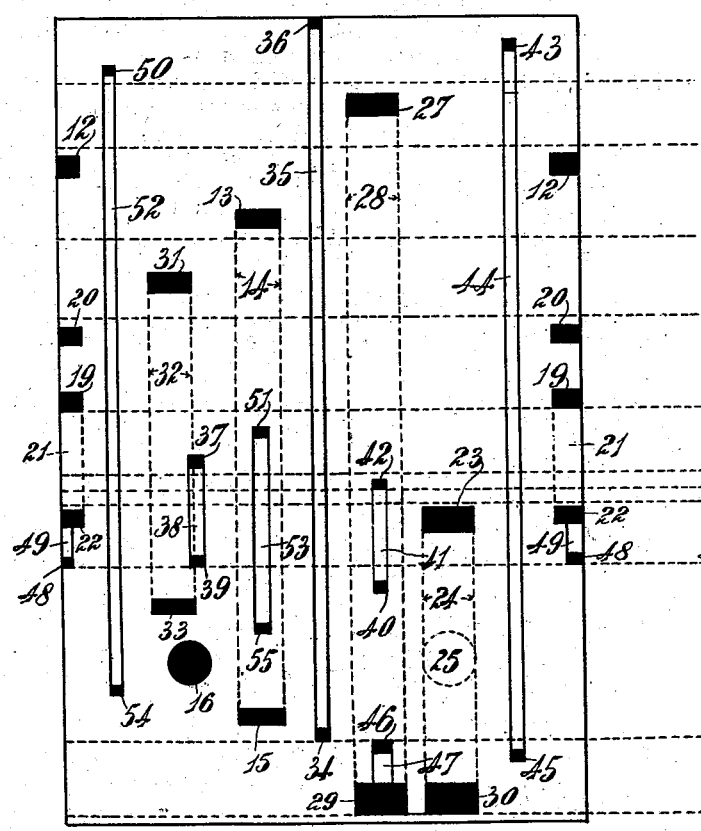
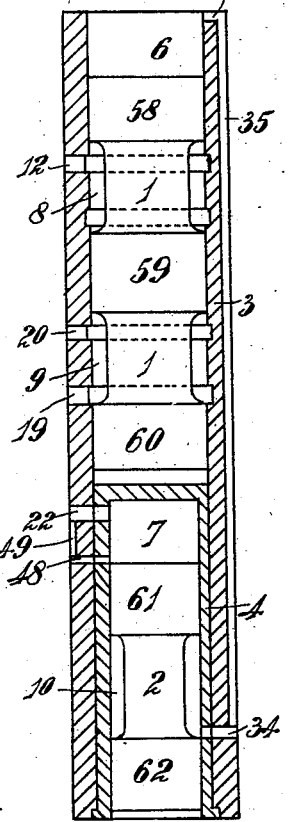

UNITED STATES PATENT OFFICE.

WILLIAM ARMSTRONG WOODESON, OF GATESHEAD, ENGLAND, ASSIGNOR TO CLARKE, CHAPMAN AND COMPANY, LIMITED, OF GATESHEAD, ENGLAND.

STEAM-ACTUATED VALVE FOR ENGINES AND MOTORS.

SPECIFICATION forming part of Letters Patent No. 694,709, dated March 4, 1902.

Application filed September 21, 1901. Serial No. 76,113. (No model.)

*To all whom it may concern:*

Be it known that I, WILLIAM ARMSTRONG WOODESON, a subject of the King of Great Britain and Ireland, residing at Gateshead-on-Tyne, in the county of Durham, England, have invented Improvements in Steam-Actuated Valves for Engines and Motors, of which the following is a specification.

This invention relates to improvements in that kind of piston-valve distributing mechanism for direct-acting steam-pumps, feed-pumps, compressors, rock-drills, or other engines actuated by steam or compressed air of the kind described in the specification of Letters Patent No. 655,537, granted to me, in which the valve that controls the admission and the exhaust of the actuating fluid to and from the motor-cylinder is moved so as suddenly to put the respective ends of the cylinder into communication with live steam and exhaust as required, its operation being effected by the actuating fluid (hereinafter called "steam") itself under the action of an auxiliary valve operated by a moving part, such as the cross-head of the piston-rod.

Now this invention has for its object to improve the construction and working of such piston-valve distributing mechanism, as hereinafter more fully described, and pointed out in the claims.

The accompanying illustrative drawings show, as an example, part of the motor of a direct-acting steam-pump provided with steam-distributing apparatus according to this invention.

Figures 1 and 2 show part of the motor-cylinder and the valve-chest as seen from the opposite sides of a vertical central sectional plane. Figs. 3 and 4 show the same in section on the lines A A and B B, respectively, of Figs. 1 and 2. Fig. 5 shows a development of the periphery of the liner, the plane of division being indicated by the line C C of Fig. 3; and Fig. 6 shows the liner in vertical central section and with the valves in the position shown in Figs. 1 and 2.

The main valve 1 and the auxiliary valve 2 are accommodated in a liner 3, which is of suitable material, such as cast-iron, and is provided with a second liner 4, closed at its upper end by a wall 5, that forms a transverse partition and divides the liner 3 into two chambers 6 and 7 in line with each other for the valves 1 and 2, respectively.

The main valve 1 is of the piston type and is provided with three rings 58, 59, and 60, that fit the liner 3 and between which there are two portions of smaller diameter that form chambers 8 and 9. The auxiliary valve 2 is also of the piston type and is provided with two rings 61 and 62, that fit the second liner 4 and between which there is a portion of smaller diameter that forms a chamber 10. When the piston 11 of the motor-cylinder is in its highest position, as is shown in Figs. 1 and 2, the chamber 8 between the rings 58 and 59 forms a communication between ports 12 and 13 in the liner 3, of which the port 13 is connected by a passage 14, a port 15, and the chamber 10 with the steam-inlet 16 of the valve-chest, and the port 12 is connected by a passage 17 with the upper end of the cylinder 18, while the chamber 9 between rings 59 and 60 forms a communication between ports 19 and 20 in the liner 3, of which the port 19 is connected by a passage 21, a port 22, the chamber 7, a port 23, and a passage 24, with the exhaust-outlet 25, and the port 20 is connected by a passage 26 with the lower end of the cylinder 18. When the piston 11 of the motor is in its lowest position, the valve 1 is in such a position that the upper end of the cylinder 18 is in full communication with the exhaust-outlet 25 through the passage 17, the port 12, the chamber 8, a port 27, a passage 28, a port 29, the chamber 7, a port 30, and the passage 24, while the lower end of the cylinder 18 is in full communication with the steam-inlet 16 through the passage 26, the port 20, the chamber 9, a port 31, a passage 32, a port 33, and the chamber 10.

When the main valve 1 is in the position shown in Figs. 1 and 2, the chamber 10 of the auxiliary valve 2 is in communication with the upper end of the chamber 6 through a port 34, a passage 35, and a port 36. Steam is thus admitted to the chamber 6 and the main valve 1 kept in the position shown, steam from the lower end of the chamber 6 having during the downward movement of the valve 1 been expelled therefrom to the exhaust-outlet 25 of the valve-chest through a port 37, a passage 38, a port 39, the chamber 7, the port 23, and the passage 24. When, however, the valve 1 is at the upper end of its stroke, it is kept in position by steam reaching the lower end of the chamber 6 from the chamber 10 of the valve 2 through a port 40, a passage 41, and a port 42, steam from the upper end of the chamber 6 having been expelled through a port 43, a passage 44, a port 45, the chamber 7, the port 30, and the passage 24 to the exhaust-outlet 25.

As will be seen, the positions of the ports 37 and 43 in the chamber 6 are such as to cause the main valve 1 to be cushioned at the ends of its strokes. In order to balance the main valve 1, passages forming almost complete rings are made in the wall of the liner 3 as continuations of the ports 36, 43, 50, 27, 12, 13, 31, 20, 19, 51, 37, and 42, respectively, so as to surround the rings of the valve 1 when these rings are opposite to the corresponding ports.

The ports 33 and 15 are placed in the liner 4 in such a position that when the piston 11 has traveled, say, three-quarters of its upstroke the auxiliary valve 2 closes the port 33 and so cuts off the passage of steam to the lower end of the cylinder 18 and causes the upstroke of the piston 11 to be completed by the expansion of the steam that has already been admitted to the cylinder. On the return stroke of the piston 11, say at three-quarters of the way down, the auxiliary valve 2 closes the port 15, and thus cuts off the passage of steam to the upper end of the cylinder 18 to cause the steam that has been already admitted to complete the stroke of the piston 11 expansively.

The piston 11 is shown at the end of its normal upstroke with the auxiliary valve 2 in such a position as to close the exhaust-port 30. Should the valve 1 then not be moved down with sufficient speed or should the piston 11 travel farther from any cause, the auxiliary valve 2 would be moved also and would for the purpose of preventing the piston 11 from striking the cover of the cylinder 18 admit live steam to the exhaust side of the piston 11 from the chamber 10 through a port 46, a passage 47, the port 29, the passage 28, the port 27, the chamber 8, the port 12, and the passage 17. When the piston 11 is at the end of its normal downstroke, the auxiliary valve 2 is then in such a position as to close the exhaust-port 23. Should the main valve then not be moved up with sufficient speed or should the piston 11 travel any farther after closing the port 23, the auxiliary valve 2 would be moved so as to form a steam-cushion at the lower end of the cylinder by admitting live steam to the exhaust side of the piston 11 from the chamber 10 through a port 48, a passage 49, the port 22, the passage 21, the port 19, the chamber 9, the port 20, and the passage 26.

50 and 51 are auxiliary steam-ports which supply steam to the top and the bottom of the main valve 1, respectively, after the ports 34 and 40 have been closed by the auxiliary valve 2, the ports 50 and 51 being connected with the chamber 10 by passages 52 and 53 and ports 54 and 55, respectively.

The steam-passages 14 and 32 are externally connected to the steam-supply pipe by pipes 56 and 57, provided with suitable valves, so that if the piston 11 stop during that portion of the stroke through which it is propelled by expansion of the steam steam from the steam-supply pipe can be admitted to either end of the cylinder 18 by opening the valve on the pipe 56 or 57, so as to cause the piston to be moved to the end of the stroke, and thereby start the pump. The valve fitted to the pipe 56 or 57 is then closed and the pump worked in the manner hereinbefore described.

The movement of the auxiliary valve 2 is effected by the cross-head of the pump-rod in a manner well understood. As will be obvious, the valve-chest liner 3 may be divided into two chambers by means of a partition made in one with the liner, as described in the before-mentioned patent, in lieu of having a second liner 4.

It will be seen that in the apparatus described and shown there is only a single passage connecting each end of the cylinder with the valve-chest instead of two passages, as in the apparatus described in the aforesaid specification.

What I claim is—

1. Means for distributing and controlling the steam in a motor, comprising a main valve and an auxiliary valve placed in line with each other, said auxiliary valve being so arranged as to cut off the steam-supply at a fixed point of the stroke of the motor-piston as set forth.

2. Means for distributing and controlling the steam in a motor, comprising a main valve and an auxiliary valve, valve-chambers therefor, and a main steam-inlet and a main steam-outlet, said auxiliary valve controlling said inlet and outlet, as set forth.

3. Means for distributing and controlling the steam in a motor, comprising a main valve and an auxiliary valve placed in line with each other and working in a liner divided into two valve-chambers, passages connecting the steam-inlet and exhaust-outlet with the auxiliary-valve chamber and the auxiliary-valve chamber with the main-valve chamber, said auxiliary valve directly controlling said inlet and outlet, as set forth.

4. Means for controlling and distributing the steam in motors comprising two valve-chambers in line with each other and contained within the same liner, a main distributing-valve in one of said chambers, an auxiliary valve in the other of said chambers, adapted to operate said main distributing-valve by controlling the passage of steam thereto and to directly control the main steam inlet and outlet, as set forth.

5. Means for controlling and distributing the steam in motors comprising two valve-chambers in line with each other and contained within the same liner, a main distributing-valve in one of said chambers, an auxiliary valve in the other of said chambers, adapted to operate said main distributing-valve by controlling the passage of steam thereto and to directly control the main steam inlet and outlet, and means for moving said auxiliary valve, as set forth.

6. Means for controlling and distributing steam in motors comprising two valve-chambers in line with each other, a main distributing-valve in one of said chambers, an auxiliary valve in the other of said chambers, a steam-supply pipe, and means whereby steam can be admitted to either end of the cylinder direct from the steam-supply pipe, as set forth.

7. Means for controlling and distributing steam in motors comprising two valve-chambers in line with each other, a main distributing-valve in one of said chambers, an auxiliary valve in the other of said chambers, a steam-supply pipe, and means whereby steam can be admitted to the exhaust side of the motor-piston after the exhaust-outlet has been closed, as set forth.

8. Means for controlling and distributing the steam in motors comprising two valve-chambers in line with each other and contained within the same liner, a main distributing-valve in one of said chambers, an auxiliary valve in the other of said chambers, a port within said auxiliary-valve chamber adapted to be uncovered by said valve should the main piston exceed its normal stroke and admit live steam to the exhaust side of the piston, as set forth.

9. Means for distributing and controlling the steam in a motor, comprising a main valve and an auxiliary valve, valve-chambers therefor, passages connecting said valve-chambers together, and connections between some of said passages and the main steam-supply, adapted to allow steam to pass directly to either end of the motor-cylinder, as set forth.

10. Means for controlling the passage of steam to and from a motor-cylinder, comprising a main-valve chamber, a main valve therein, an auxiliary-valve chamber, an inlet for steam thereto, an exhaust-outlet therefrom, passages connecting the ends of the motor-cylinder with the auxiliary-valve chamber, an auxiliary valve in said chamber, and means for moving said auxiliary valve, so as to put the ends of the said cylinder alternately in communication with the main steam inlet and outlet as set forth.

11. Means for controlling the passage of actuating fluid to and from a motor-cylinder comprising two valve-chambers, a main piston-valve, having two annular chambers, in one of said valve-chambers, an auxiliary piston-valve having a single annular chamber in the other of said valve-chambers, an inlet for steam, an exhaust-outlet, a permanent communication between said steam-inlet and the annular chamber of the auxiliary valve, passages adapted to form a communication between the annular chamber of said auxiliary valve, the auxiliary-valve chamber and the ends of the motor-cylinder, and means for moving said auxiliary valve so as to put the ends of said cylinder alternately in communication with the main steam inlet and exhaust, as set forth.

Signed at Gateshead, in the county of Durham, England, this 4th day of September, 1901.

WILLIAM ARMSTRONG WOODESON.

Witnesses:
J. O. DAVISON,
THOS. HENDERSON.